United States Patent [19]

Skriba et al.

[11] Patent Number: 5,045,240
[45] Date of Patent: Sep. 3, 1991

[54] CONTAMINATED SOIL RESTORATION METHOD

[75] Inventors: Michael C. Skriba, Swissvale Boro; David C. Grant, Gibsonia, both of Pa.

[73] Assignee: Westinghouse Electric Corp., Pittsburgh, Pa.

[21] Appl. No.: 345,852

[22] Filed: May 1, 1989

[51] Int. Cl.$^5$ .......................... G21F 9/28; C02F 1/42
[52] U.S. Cl. .................... 252/626; 252/628; 210/682
[58] Field of Search ............... 252/626, 628; 210/682, 210/688

[56] References Cited

U.S. PATENT DOCUMENTS

| | | | |
|---|---|---|---|
| 2,865,705 | 12/1958 | James et al. | 210/682 |
| 2,902,338 | 9/1959 | Bane | 210/682 |
| 4,206,049 | 6/1980 | Stana et al. | 210/22 R |
| 4,234,448 | 11/1980 | Hirano et al. | 252/626 |
| 4,423,008 | 12/1983 | Yan | 210/682 |
| 4,741,866 | 5/1988 | Grantham et al. | 252/626 |
| 4,778,628 | 10/1988 | Saha et al. | 252/633 |
| 4,780,239 | 10/1988 | Snyder et al. | 252/626 |
| 4,783,253 | 11/1988 | Ayres et al. | 209/2 |
| 4,783,263 | 11/1988 | Trost et al. | 210/638 |
| 4,882,094 | 11/1989 | Rubin et al. | 252/626 |

Primary Examiner—Robert L. Stoll
Assistant Examiner—Joseph D. Anthony
Attorney, Agent, or Firm—Daniel P. Cillo

[57] ABSTRACT

Waste material containing hazardous or radio-active species is treated by: separating a portion of the waste material and identifying the particle size range of the severely contaminated fraction by use of a sieving apparatus (6) and a contamination detection apparatus (8); passing the waste material (15) near a contamination detection apparatus (12) to identify the waste material that is contaminated and segregate that material by a diverter (17) to provide contaminated portion (19); passing the contaminated portion (19) into a fluidized bed apparatus (16) where an aqueous leaching solution (21), effective to leach soluble, contamination species, contacts the contaminated material at an upward velocity effective to remove the particle size range that is determined to contain the severely contaminated fraction of the waste material, to provide a severely contaminated effluent slurry (24); and removing the leach solution from the slurry in a dewatering apparatus (26) to provide a solution (27) containing solubilized, severely contaminated species.

9 Claims, 2 Drawing Sheets

CONTAMINATED SOIL RESTORATION METHOD

BACKGROUND OF THE INVENTION

1. Field of the Invention

This invention relates to a method of restoring radioactive soil by initial radioactive assay scanning, fluidization separation, selective ion removal, and concentration.

2. Description of the Prior Art

The contamination of soils, ores, or other materials with radioactive species, such as radium, uranium, and thorium, is a common environmental problem. In a great number of cases, the radioactive contamination is not homogeneously distributed through the mass of soil to be treated, also, it is common for the contamination to be present in a particular fraction of the soil, such as the lighter silt, humic, or clay fraction. In some instances the contaminants may be soluble and in other instances insoluble. The location of such materials varies from residential areas, to mining sites, to radioactive material processing facilities. In all cases, it is necessary to remove or clean up the soil or other material. The disposal of contaminated soil is becoming increasingly expensive, and the practice of digging the soil up in one area, only to bury it in another, is becoming less acceptable environmentally.

In instances in the past, some radioactive waste materials were stored in high integrity 55 gallon containers and placed in underground trenches lined with clay. An improvement of this storage method is described in U.S. Pat. No. 4,778,628 (Grant et al.), where the high integrity containers were stored underground in a barrier structure containing layered activated carbon, zeolite, and clay. These types of solutions are not feasible, however, when the volume of soil or other material involved is extremely large. In the case of soil, typical soil removal methods would remove uncontaminated as well as contaminated soil, usually providing a large volume.

U.S. Pat. No. 4,783,253 (Ayres et al.), teaches a method that partly solves hazardous waste separation problems. There, the waste material is placed in an alternative upward flow of fresh, pure water, and the insoluble contaminants present in the heavy fraction of the waste material are gravitationally removed. However, this process which requires a rather complicated reciprocating diaphragm apparatus and a significant difference in specific gravity between the contaminated and uncontaminated fractions, is primarily limited to high density contamination, and is limited to insoluble contaminants that won't dissolve into the water stream and be washed out of the top of the water column.

What is needed is a simplified method of treating large volumes of materials, for example, up to 9,000 kilograms per hour, containing soluble portions of hazardous or radioactive waste within a particular particle size fraction, so as to segregate the clean from the contaminated material and to concentrate the contaminated material. The method should not require large land areas, so that local treatment is a possibility, and the method should not result in waste disposal or hazardous substance problems. It is one of the main objects of this invention to provide such a method.

SUMMARY OF THE INVENTION

Accordingly, the invention resides in a method of treating waste material contaminated with soluble, hazardous or radioactive species characterized by the steps:

(1) separating a portion of contaminated waste material, and identifying the particle size range of the severely contaminated fraction of the material;

(2) identifying those portions of the waste material that are contaminated, and segregating that material, to provide contaminated waste material and disposable waste material;

(3) passing the contaminated waste material into a fluidized bed apparatus where an aqueous leaching solution, having a chemical composition effective to leach soluble contaminants present in the contaminated waste material, contacts the contaminated waste material at an upward velocity effective to remove the particle size range that is determined to contain the severely contaminated fraction of the contaminated waste material, to provide a severely contaminated effluent slurry of leach solution containing solubilized, severely contaminated species, and an effluent slurry of leach solution containing disposable, cleaned waste;

(4) removing the leach solution from the severely contaminated effluent slurry, to provide aqueous leach solution containing solubilized, severely contaminated species, and solids waste; and (5) passing the aqueous leach solution from step (4) through an ion removal apparatus effective to remove the solubilized, severely contaminated species from the aqueous leach solution, to provide cleaned, aqueous leach solution.

The invention is further characterized by adding water to the solids waste after step (4), to provide a mixture of residual contaminated water and cleaned waste material, where the contaminated water is passed through the ion removal apparatus in step (5), and the cleaned waste is dried and checked to identify any minor portions of contaminant species, which species are passed back to step (2).

The invention is also further characterized by passing the cleaned, aqueous leach solution from step (5) through a reverse osmosis apparatus, to provide: (a) cleaned, concentrated, aqueous leach solution having a chemical composition effective to leach contaminants present in the material identified in step (1), and passing said aqueous leach solution to step (3); and (b) purified water, which is added to the solids waste segregated in step (4).

This method provides a totally integrated system, minimizing chemical restoration processing, waste generation, and water consumption, which is capable of handling major amounts of soil or other materials containing portions of hazardous or radioactive species, in an economical fashion and in an energy efficient manner. While this process will be described primarily for removal of soluble species of radioactive material, such as radium, uranium, thorium, and the like, it also encompasses removal of other hazardous species such as copper, lead, or mercury in soluble form.

BRIEF DESCRIPTION OF THE DRAWINGS

In order that the invention will be more readily understood, the following description of preferred embodiments will now be described, by way of example only, with reference to the accompanying drawings, in which.

DESCRIPTION OF THE PREFERRED EMBODIMENTS

Figure 1:
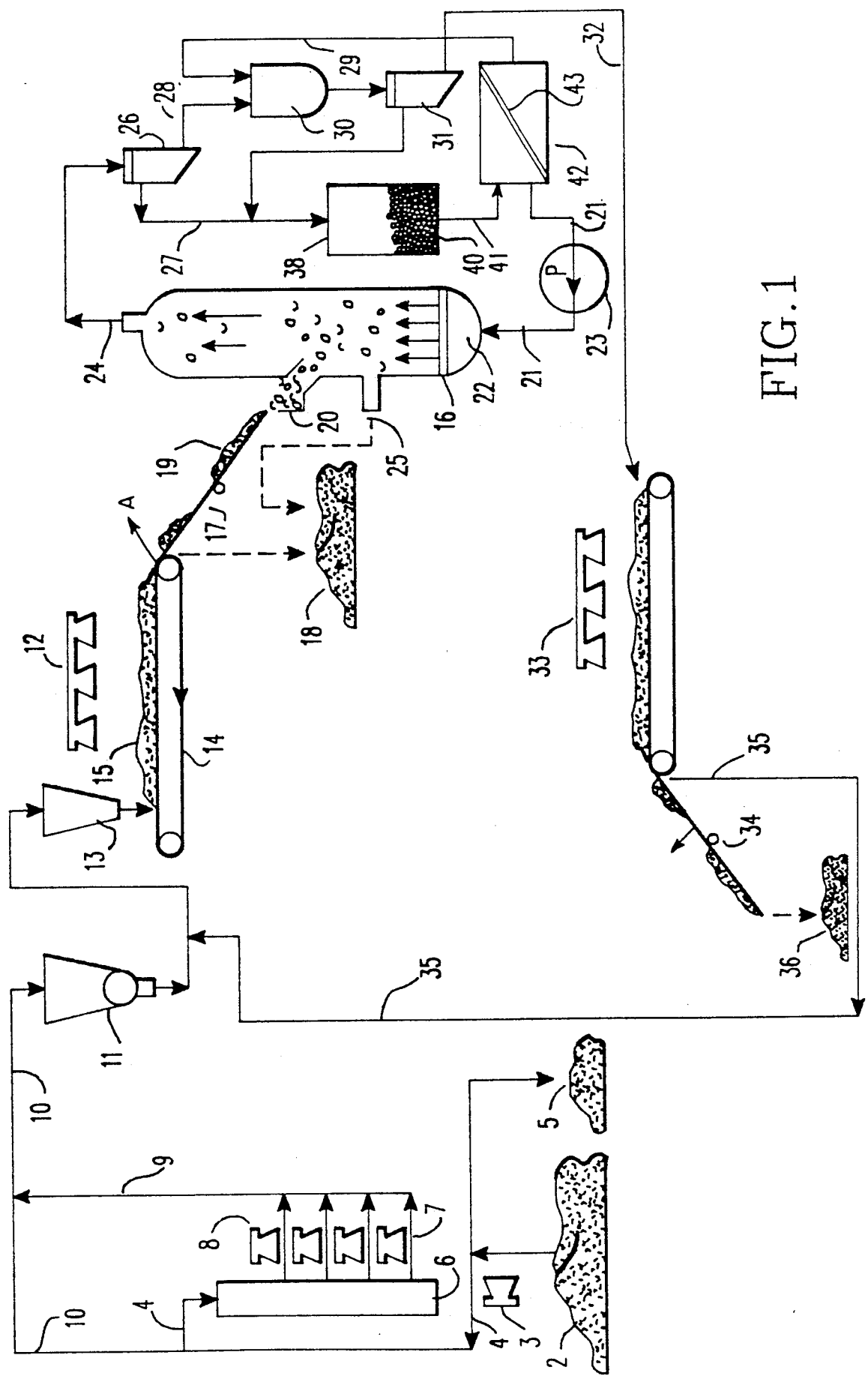
FIG. 1 is a diagram of one embodiment of a method according to this invention, for clean-up of hazardous or radioactive species from waste material.

Referring now to FIG. 1 of the Drawings, waste material 2, such as radioactive contaminated sandy soil, is checked by a radioactivity scanner 3, for example, a hand-held sodium iodide gamma ray detector. The portion of waste found to contain a concentration of over 5 picocuries per gram (>5 piC/g) of radioactive species, for example, radium-226, uranium-238, or thorium-232, is passed into stream 4 and air-dried in a greenhouse, oven, or the like (not shown). The uncontaminated portion is returned to a sanitary landfill or the area of removal 5. If non-radioactive, hazardous materials are involved, chemical sampling can be used to determine their concentration.

The contaminated portion in stream 4 is then grossly screened (not shown) to remove rocks and other objects having diameters larger than about 1.5 cm. These larger objects can again be checked for contamination and disposed of in a sanitary landfill or the area of removal if found to contain less than 5 picocuries per gram of radioactive material or minimal amounts of non-radioactive hazardous materials. If the larger objects are found to still be contaminated and if they are small enough, they can be crushed and added to the smaller sized, contaminated waste material. If they are too large or if it would be inefficient to crush them, then the whole boulder or rock, etc., can be washed separately or disposed of as contaminated waste. The waste material that is to be further processed by this method is then recombined and sealed in containers, such as 55-gallon drums, for transport to the processing facility. If the processing facility is local, sealing in containers may not be necessary.

The grossly screened, contaminated waste is then sampled (not shown) to determine its density in grams/milliliter (g/ml), and a portion is passed via line 4 into a particle separator, such as a sieving apparatus or the like 6. In the sieving apparatus, the waste is passed through a series of sieves, or the like, to provide a plurality of particle size ranges of contaminated waste, for example, over 297 micrometers; 150 micrometers to 297 micrometers; 105 micrometers to 150 micrometers; and below 105 micrometers. Each of these particle size divisions will be scanned by an array of gamma ray scanning apparatus 8 or chemically analyzed. This step can also be accomplished in the field or in the laboratory. It can also be accomplished on a continuous basis, as shown in FIG. 1 for radioactive material, where a portion of the particle size divisions pass through lines 7, past gamma ray scanners 8, and into line 9. The majority of the contaminated material will bypass the sieving apparatus via line 10. This sieving and scanning step will determine which particle size range fraction contains the primary concentration of radioactive contaminants. It will thus measure the particle size range of the severely contaminated fraction of the radioactive material. Chemical sampling should also be capable of use on a continuous basis.

The contaminated waste material can then be fed to an optional granulation apparatus 11, to crush the material and reduce its size to smaller than about 420 micrometers (40 U.S. Screen No. Sieve Size). Over 420 micrometers, subsequent aqueous fluidized bed processing will require high velocities. The waste material can be passed near a gamma ray scanning apparatus 12, containing an array of a plurality of gamma ray detectors for radioactive material. This can be accomplished by passing the waste material through a hopper 13 and onto a continuous moving belt 14, so that a layer 15 of waste material is deposited as shown. The conveyor belt would move at a rate that would allow sufficient time for the detectors to determine accurately the radioactive contaminant level of a given volume of soil. The gamma ray scanning apparatus 12 can be a sodium iodide detector, or the like, as is well known in the art. Chemical sampling could be substituted for non-radioactive, hazardous material.

The gamma ray scanning apparatus, when used, would be adjusted so as to isolate the energy decay lines associated with the particular radioactive contaminant of interest. For example, the detector would be adjusted so that the 0.08 MeV (millielectron volt) and 0.186 Mev emission line would be monitored for radium-226; the 0.094 MeV line would be monitored for uranium-238; and the 0.909 MeV and 0.927 MeV lines would be monitored for thorium-232. If any of the portions of the waste material is found by the gamma scanning ray apparatus to be severely contaminated with radioactive material, that is, over from 5 to 15 picocuries per gram of radium-226 depending on the soil depth location of the radium, over 30 picocuries per gram of uranium-238, or over 30 picocuries per gram of thorium-232, or other level of these or other radioactive material considered to be severely contaminated; that portion would be passed into an aqueous soil leach and fluidized bed apparatus 16.

The feeding into the fluidized bed 16 could be accomplished by any appropriate separation or diverter apparatus, for example, the rotating divider blade 17 shown. In the down position shown, all the severely contaminated portions 19 will be fed into the fluidized bed via entrance 20. If one or more low grade radioactive or other hazardous portions are sampled, the divider blade 17 can be raised to position A, and the low grade radioactive or other hazardous portions will be segregated, and deposited as disposable waste material 18. This disposable waste material can be returned to the excavation site as landfill.

It is common for radioactive contamination to be present in a particular fraction of the soil in soluble form. For example, soluble cationic contaminants will exchange onto the negatively charged clay fraction of the soils. In other cases, the soluble contamination may adsorb onto the light humic fraction of the soil. It is also common to have the soluble contamination present as residual ores which will have characteristics much different than the natural soil.

Ordinarily, the radioactive or hazardous material will associate or interact with finer particle sized materials, such as those below about 150 micrometers diameter (100 U.S. Screen No. Sieve Size), due to their higher surface area and activity. This is not always the case. However, for the sake of simplicity, in describing the activity of the fluidized bed apparatus 16, the description that follows will be based on the assumption that the finer fraction of particles are severely contaminated.

although the process is effective in either case. The invention will be useful on materials that do have one or more fractions that are severely contaminated, rather than a homogeneous contamination, and where the contaminant species are soluble in leach solution.

Figure 2:
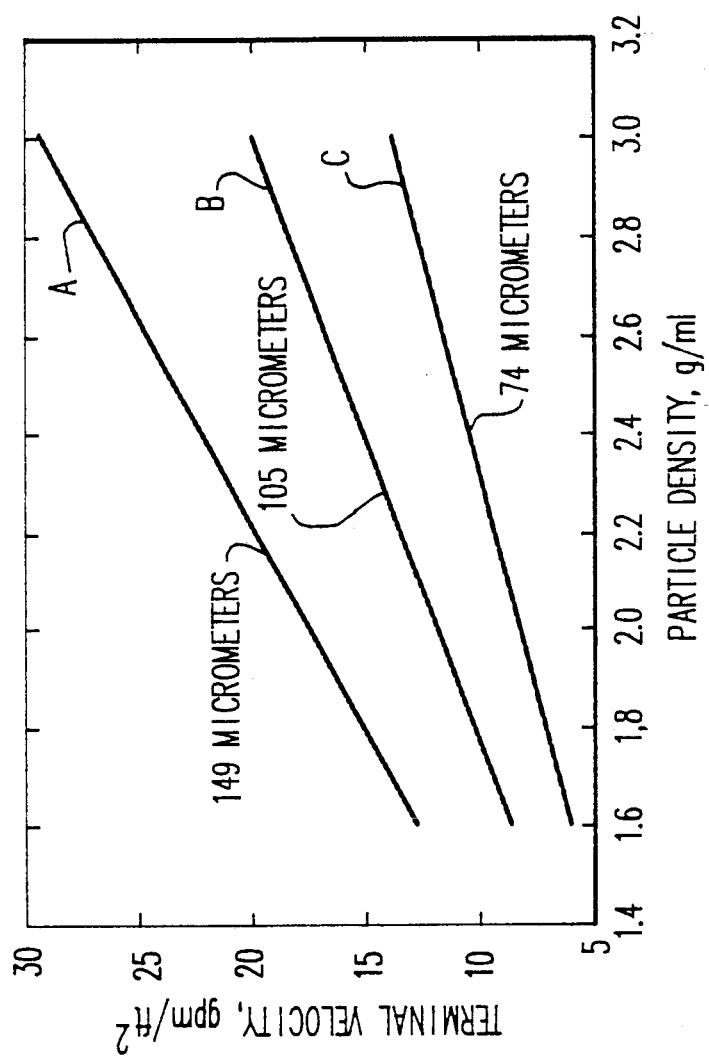
FIG. 2 is a graph of fluidized bed velocity, from 5 gpm/ft$^2$ to 30 gpm/ft$^2$, versus particle density, from 1.4 g/ml to 3.2 g/ml, for various sized particles, during operation of the fluidized bed in the method of this invention.

If the primary source of severely contaminated, radioactive material is in the fine fraction, the upward velocity of aqueous leaching solution fed from line 21 into the fluidized bed apparatus 16 is set so as to remove the light fraction from the heavy soil fraction. FIG. 2 shows a typical graph of fluidized bed terminal velocity in gal. per minute/sq. ft. versus particle density in gram/ml. for 149 micrometer particle size (100 U.S. Screen No. Sieve Size) curve A, 105 micrometer particle size (140 U.S. Screen No. Sieve Size) curve B, and 74 micrometer particle size (200 U.S. Screen No. Sieve Size) curve C. Once the terminal velocity of a particle is exceeded, it will be entrained in the fluidization liquid and be carried from the fluidized bed apparatus 16 via line 24.

The inputs of waste particle density and primary contaminated particle size(s), discussed previously, for example 105 micrometer sand (having a particle density of about 2.7 g/ml), could be fed into a computer, which, in accordance with appropriate terminal velocity curves, could be used to program the correct upward terminal velocity of the aqueous leaching solution into the leach feed end 22 of the fluidized bed by adjusting pump 23. This would effectively remove the particle size range that is determined to be severely contaminated, here, for purposes of illustration, the fine fraction exiting into line 24.

The fine fraction will exit as a severely contaminated effluent slurry of leach solution, containing solubilized, severely contaminated species. The heavy fraction, here, for purposes of illustration, not severely contaminated, would exit into line 25 as an effluent slurry of leach solution, containing disposable, cleaned waste. This would be dewatered (not shown), again checked for contamination, dried, and then deposited as disposable waste material 18. In actual cases where some non-acceptable contamination remained, line 25 could be fed back to hopper 13 or disposed of as radioactive waste.

Radium can be removed from the soil using, for example, hydrochloric acid, nitric acid, sodium carbonate, sodium chloride, and their mixtures, as the radium leach agent solution fed through line 21 into the fluidized bed apparatus 16. Uranium can be removed from the soil using, for example, hydrochloric acid, nitric acid, sulfuric acid, sodium carbonate, sodium chloride, and their mixtures, as the uranium leach agent solution. Thorium can be removed from the soil using, for example, hydrochloric acid, nitric acid, sulfuric acid, and their mixtures, as the thorium leach agent solution. Other effective leach solutions can be used for radium, uranium or thorium, as well as for other radioactive species that may be present, such as radioactive iodine ruthenium, cesium, strontium, or cobalt; or for non-radioactive contaminants such as copper, lead, or mercury.

The severely contaminated slurry of leach solution in line 24 can be fed to a dewatering apparatus 26, such as a centrifuge, to separate the leach solution from the contaminated slurry, providing an aqueous leach solution in line 27 containing solubilized, severely contaminated species, and a soil solids sludge waste in line 28. Preferably, water from line 29 is added to the soil sludge, to provide a mixture of residual contaminated water and cleaned waste material in soil wash apparatus 30. A belt filter press can be used to combine the dewatering and soil wash step.

The cleaned waste material can then be passed through a dewatering apparatus 31, such as a centrifuge, and dried if necessary, to remove water and to provide cleaned waste material in line 32. The cleaned waste can then be scanned by a gamma ray scanning apparatus 33, containing an array of a plurality of gamma ray detectors, to identify waste material containing minor portions of radioactive species, which are segregated by separation or diverter apparatus 34 and passed to hopper 13 via line 35. Disposable, cleaned waste 36 can be returned to a sanitary landfill. Chemical sampling, again, can be used for non-radioactive contaminants.

The aqueous leach solution, containing solubilized, severely contaminated species, in line 27, can then be passed to ion exchange column 38, where ion exchange beads or the like 40, usually synthetic organic polymer or natural zeolite particles, having diameters over about 300 micrometers (30 U.S. Screen No. Sieve Size), well known to attract the contaminants present in line 27, would attract and remove most of the solubilized radium, uranium, thorium, other radioactive contaminants, or non-radioactive, hazardous contaminants.

Depending on the extraction solution and the form of contaminant, an anionic or cationic material may be used. Useful ion exchange materials include a strong acid cationic resin containing sulfonic functional groups with a styrene copolymer, and the like, for radium; and the same strong acid cationic resin, or a strong base anionic resin containing quaternary ammonium functional groups with a styrene or styrene divinylbenzene copolymer, and the like, for uranium and thorium. Cation exchange resins, having highly selective or chelating functional groups, can be used for any heavy metal, including copper, lead, or mercury. In place of an ion exchange column, a precipitator could be used as an ion removal apparatus, where the solution in line 27 would be mixed with ferric hydroxide, barium sulfate, or the like, to precipitate or co-precipitate radium or thorium, or with hydroxide to precipitate thorium or uranium, or with peroxide to precipitate uranium. Other ion exchange or precipitation materials could be used depending on the hazardous or radioactive material involved.

The ion exchange column (or precipitator) effluent, that is, the cleaned aqueous leach solution in line 41, can then be sent to a reverse osmosis unit 42, where in accordance with well-known general principals described, for example, in U.S. Pat. No. 4,206,049 (Stana et al.), the solution is split into a concentrated brine solution stream 21, which may be refortified with appropriate leaching agents, fed to pump 23, and reused for leaching; and a low total dissolved solids permeate stream 29, which is reused for washing in soil wash apparatus 30. The reverse osmosis membrane 43 is in semipermeable form and can be made, for example, of modified cellulose acetate, polyamic acid salt, polyphenylester, polysulfone, or polysulfonamide, and may be operated at about 21 kg/cm$^2$ (300 psi).

The invention will now be illustrated with reference to the following example.

EXAMPLE

A soil sample suspected of having excessive levels of radium and uranium contamination was examined using a planar sodium iodide detector, first set at 0.08 MeV and 0.186 MeV to measure content of radium-226, and then at 0.094 MeV to measure content of uranium-238.

Readings indicated a radium-226 level of 30 piC/g and a uranium-238 level of 80 piC/g, indicating that the soil sample was severely contaminated with both isotopes. Some of the soil sample was then segregated into several portions based on particle size and each portion again examined using the planar sodium iodide detector. The fine particles, those below about 125 micrometers (120 U.S. Screen No. Sieve Size) were found to contain a significant fraction of the radioactive materials.

The soil sample was then passed into a tubular, vertical fluidized bed apparatus. A 2 gram/liter sodium carbonate solution was used as the leaching agent solution for the radium-226 and uranium-238. The solution was pumped upward through the fluidized bed apparatus at a velocity effective to remove the 125 micron and less fraction of the soil sample, that is, the fraction containing most of the radioactivity. This severely radioactive fraction passed out of the top of the fluidized bed apparatus as a leach solution slurry containing solubilized, severely radioactive species.

The leach solution slurry that passed out the bottom of the fluidized bed apparatus contained the larger size fraction of particles. This larger size fraction slurry was dried and examined using the sodium iodide detector set for radium-226 and uranium-238. Readings indicated that the heavy fraction contained less than 15 piC/g of radium-226 and less than 30 piC/g of uranium-238. This was a radioactivity reduction greater than 50% in the case of radium and a radioactivity reduction of 63% in the case of uranium. Nitric acid, hydrochloricacid, sodium chloride, or their mixture could have been substituted for the sodium carbonate as a leaching agent. Also, the severely radioactive solution exiting the top of the fluidized bed apparatus could have been passed through an ion exchange column or precipitator, to provide cleaned, aqueous leach solution.

We claim:

1. A method of treating waste material contaminated with soluble radioactive species comprising the steps:
   (1) providing waste material containing soluble radioactive species and separating that portion of the waste material found to be contaminated, to provide contaminated waste material;
   (2) crushing the contaminated waste material so that it has a particle size below 420 micrometers, determining the contaminant, the contaminated waste material density, and identifying the particle size range of the most severely contaminated fraction of the contaminated waste material by separation into a plurality of particle size fractions and scanning each fraction for radioactivity or chemically analyzing each fraction;
   (3) passing the contaminated waste material, having a known density, into a fluidized bed apparatus where an aqueous leach solution, having a chemical composition effective to leach soluble contaminants present in the contaminated waste material, contacts the contaminated waste material at an upward velocity effective to entrain and remove, at the top of the apparatus, particles including the particle size range that is determined to contain the most severely contaminated fraction of the contaminated waste material, to provide a severely contaminated, top effluent slurry containing solubilized, severely contaminated species, and a bottom effluent slurry containing disposable, cleaned waste where each slurry contains the aqueous leach solution;
   (4) removing the leach solution from the severely contaminated effluent slurry, to provide aqueous leach solution containing solubilized, severely contaminated species, and cleaned solids waste; and
   (5) passing the aqueous leach solution from step (4) through an ion removal apparatus effective to remove the solubilized, severely contaminated species from the aqueous leach solution, to provide cleaned, aqueous leach solution.

2. The method of claim 1, where the contaminated waste contains radioactive species which contains at least one of radioactive radium, radioactive uranium, and radioactive thorium present at concentrations of over 5 picocuries/gram, and where the ion removal apparatus is selected from an ion exchange column containing ion exchange material or a precipitator.

3. The method of claim 1, where, after step (4), water is added to the solid waste, to provide a mixture of residual contaminated water and cleaned waste material, where the contaminated water is passed through the ion removal apparatus in step (5), and the cleaned waste is dried.

4. The method of claim 1, where the cleaned, aqueous leach solution from step (5) is passed through a reverse osmosis apparatus, to provide:
   (a) cleaned, concentrated, aqueous leach solution having a chemical composition effective to leach contaminants present in the contaminated waste material and identified in step (2), which aqueous leach solution is passed to step (3); and
   (b) purified water, which is added to the solids waste segregated in step (4).

5. The method of claim 1, where the contaminated waste material contains radioactive radium, and the aqueous leaching solution used in step (3) is selected from the group consisting of hydrochloric acid, nitric acid, sodium carbonate, sodium chloride, and mixtures thereof.

6. The method of claim 1, where the contaminated waste material contains radioactive uranium, and the aqueous leaching solution used in step (3) is selected from the group consisting of hydrochloric acid, nitric acid, sulfuric acid, sodium carbonate, sodium chloride, and mixtures thereof.

7. The method of claim 1, where the contaminated waste material contains radioactive thorium, and the aqueous leaching solution used in step (3) is selected from the group consisting of hydrochloric acid, nitric acid, sulfuric acid, and mixtures thereof.

8. The method of claim 1, where the contaminated waste material passed into the fluidized bed apparatus in step (3) has a density of from 1.4 g/ml to 3.2 g/ml, the upward velocity of the leaching solution is from 5 $gpm/ft^2$ to 30 $gpm/ft^2$, and where, in step (5), an ion exchange column is used to provide cleaned aqueous leach solution.

9. The method of claim 1, where the contaminated waste contains at least one of radioactive radium and radioactive uranium, the radioactive material is passed through the fluidized bed apparatus in step (3) and has a particle size below 420 micrometers, and an ion exchange column is used in step (5) to provide cleaned aqueous leach solution.

* * * * *